United States Patent [19]

Hayata

[11] Patent Number: 4,691,431
[45] Date of Patent: Sep. 8, 1987

[54] METHOD OF MAKING A METAL MOLD FOR TIRE VULCANIZATION

[75] Inventor: Naohiro Hayata, Kakogawa, Japan

[73] Assignee: Sumitomo Rubber Industries, Ltd., Kobe, Japan

[21] Appl. No.: 867,592

[22] Filed: May 27, 1986

Related U.S. Application Data

[63] Continuation of Ser. No. 786,907, Oct. 15, 1985, abandoned.

[30] Foreign Application Priority Data

Oct. 31, 1984 [JP] Japan .............................. 59-230590

[51] Int. Cl.$^4$ .......................................... B23P 19/00
[52] U.S. Cl. .................................. 29/526 R; 29/557;
249/135; 264/220; 425/28 R
[58] Field of Search ............... 29/463, 557, 526 R,
29/416, 433; 76/107 R; 264/220; 425/28 R;
249/135

[56] References Cited

U.S. PATENT DOCUMENTS

| | | | |
|---|---|---|---|
| 1,380,645 | 6/1921 | Fisher | 425/47 |
| 1,486,951 | 3/1921 | DeLavaud | 249/160 |
| 2,234,337 | 12/1940 | Bostwick | 76/107 R UX |
| 2,599,841 | 6/1952 | Kent | 425/47 |
| 2,607,816 | 8/1952 | Ryder et al. | 29/416 X |
| 2,754,546 | 7/1956 | Mason et al. | 425/28 |
| 2,808,621 | 10/1957 | Torrey | 425/32 |
| 3,121,947 | 2/1964 | Knox | 76/107 X |
| 3,137,919 | 6/1964 | Lakin | 29/416 X |
| 3,234,640 | 2/1966 | Lewis | 29/526 X |
| 3,301,352 | 1/1967 | Carson | 29/526 R X |
| 3,485,169 | 3/1976 | Tippin | 425/47 |
| 3,509,614 | 5/1970 | Eldred | 29/416 X |
| 3,983,193 | 9/1976 | Walker et al. | 264/220 X |
| 3,999,907 | 12/1976 | Pappas | 425/46 |
| 4,185,056 | 1/1980 | Detwiler | 264/220 X |
| 4,633,556 | 1/1987 | Santi | 29/416 X |

FOREIGN PATENT DOCUMENTS 145331 4/1961 U.S.S.R. ................................ 425/32

Primary Examiner—Charlie T. Moon
Attorney, Agent, or Firm—Armstrong, Nikaido, Marmelstein & Kubovcik

[57] ABSTRACT

A metal mold for tire vulcanization comprising a tread pattern mold obtained by piling up and fixing a plurality of laminas in order; the laminas have molding portions corresponding to sectional shapes of a tread portion or an outer surface of a tire, the sectional shapes are obtained by slicing a tire in lamina-shape parallel to an equator plane of the tire.

The metal mold of the present invention can be manufactured efficiently since the provision of working data and the working become easy. Furthermore, the mending of the metal mold resulting from partial defects and the partial change of the metal mold are easy since the metal mold of the present invention is not an integral but laminate construction.

6 Claims, 10 Drawing Figures

METHOD OF MAKING A METAL MOLD FOR TIRE VULCANIZATION

This application is a division of application Ser. No. 786,907 filed Oct. 15, 1985, now abandoned.

BACKGROUND OF THE INVENTION

The present invention relates to a metal mold for tire vulcanization.

Hitherto, the following three kinds of metal mold are employed for molding a tire.

(1) A metal mold comprising an upper and a lower tread rings 50 having an uneven molding portion (P') corresponding to a tread pattern P as shown in FIGS. 6 and 7. The tread rings 50 are made by casting Aluminum and set in a shell 51 made of a cast steel or a cut steel block.

(2) A metal mold comprizing small pieces (pattern segments) 52 having a molding portion corresponding to a tread pattern P as shown in FIG. 8. The small pieces 52 are made by casting Aluminum and arranged in order in a circumferential direction and set in the similar shell as described above.

(3) A metal mold comprizing a mold made of, for example, a cast steel on which a tread pattern P is engraved directly.

The above-mentioned conventional metal molds, however, need expensive working machines, and require long working time and high manufacturing cost because of greater part of manual working since it is difficult to produce working data and to mechanize the working.

These types of metal molds also require a large number of vent holes for venting air when the vulcanization of a tire is carried on. Furthermore, in case of mending flaws caused by the fall of articles on the molding surface and blowholes of Aluminum casting, and in case of changing a tread pattern partly, and the like, these types of metal molds require long working time and high cost because of the necessity of manual operation and Aluminum welding.

The object of the present invention is to provide a metal mold for tire vulcanization which is easy to work and conveninent for mending, changing, and the like.

SUMMARY OF THE INVENTION

According to the present invention, there is provided a metal mold for tire vulcanization comprising a tread pattern mold obtained by piling up and fixing a plurality of laminas in order; the laminas have molding portions corresponding to sectional shapes of a tread portion or an outer surface of a tire, the sectional shapes are obtainable by slicing a tire in lamina-shape parallel to the equator plane of the tire by using a CAD system.

The metal mold for tire vulcanization according to the present invention comprizes a plurality of piled up laminas corresponding to a plurality of vertical section in the circumferential direction of a tire, therefore, the creation of working data and the working become so easy that a metal mold can be made with efficiency such that the present manufacturing time of no less than three months can be shortened to not more than one month. The working of vent holes becomes easy and diameters of vent holes can be made small. Furthermore, the mending of the metal mold resulting from partial defects and the partial remolding of the metal mold are easy since the metal mold of the present invention is not an integral but laminate (assemble and disassemble type) construction.

The above and other objects of the invention will be seen by reference to the description taken in connection with the accompanying drawings.

DETAILED DESCRIPTION

Figure 1:
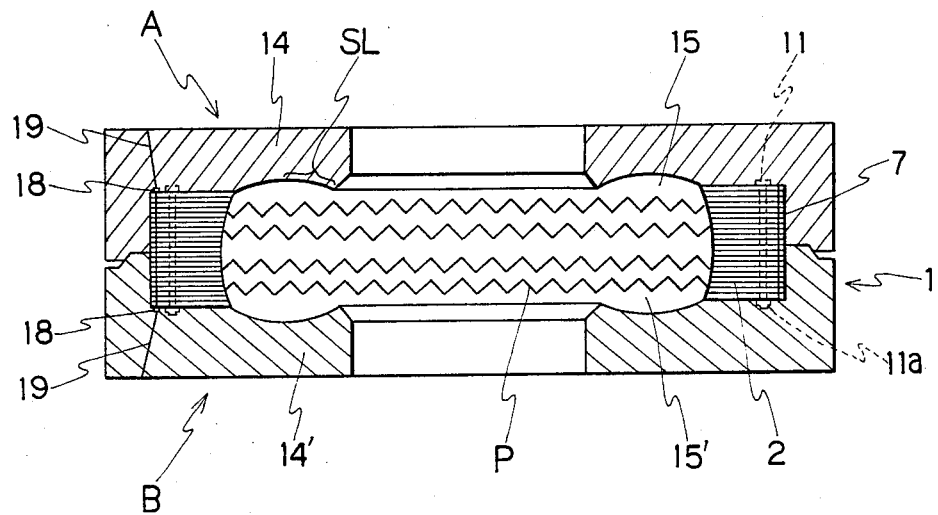
FIG. 1 is a sectional view illustrating an embodiment of a metal mold for tire vulcanization of the present invention.
Figure 3:
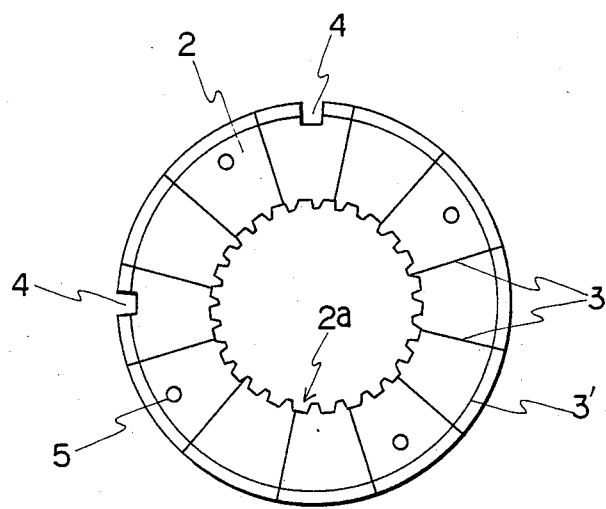
FIG. 3 is a plan view of a lamina for forming a tread pattern in a metal mold of the present invention.

FIGS. 1 and 3 illustrate an embodiment of a metal mold for tire vulcanization of the present invention. Numeral 1 is a metal mold comprising a plurality of piled up laminas 2. The lamina 2 has an uneven molding portion 2a corresponding to a pattern shape of a section (shown in FIG. 5) which can be obtained by slicing a tire T, shown in FIG. 4, in lamina-shape parallel to its equator plane (i.e. a sectional plane obtained by cutting along the center line CL of widthwise direction on an outer surface of a tire) by using a CAD system. The pattern shape of a lamina 2 is reverse to the pattern shape of a tire section in terms of unevenness. The uneven shapes are naturally different from one another little by little in accordance with a position of a tire section. A plurality of narrow grooves 3 are provided on one plane or both planes of the lamina 2. After the laminas 2 are assembled, the narrow grooves function as vent holes for venting gas when the vulcanization of a tire is carried on. Furthermore, a narrow groove 3' of the circumferential direction is provided to communicate with narrow grooves 3, and the narrow groove 3' communicates with a notch 4 of the lamina 2 for positioning described below. There are provided positioning notches 4 on an outer circumference of the lamina 2. The notches 4 are used when the laminas are assembled. Furthermore, there are holes 5 for fixing bolts in a plurality of portions of the lamina 2.

A plurality of laminas 2 are collected and grouped into two sets, i.e. an upper mold A and a lower mold B, with relation to the equator plane of a tire. Each set includes laminas 2 piled up one another which form a tread pattern mold (tread ring) and are contained in a container 7. On a ring-shape container 7, there are provided ear-shape fixing portions (pressing means) 9 and inward projections 10 for positioning which engage with notches 4 of the lamina 2. Laminas 2 are positioned, piled up in order and fixed to the container 7 with bolts 11. Numeral 13 is a recess shaped on the lamina 2 which allows an edge portion of the bolt 11 and the fixing portion 9 to fit in so as not to disturb a correct piling up of containers for an upper mold and a lower mold. The use of this type of container enables easy positioning of laminas 2. But laminas 2 can be fixed with bolts only without using a container.

Each of shells 14, 14' for the upper half mold A and the lower half mold B respectively has recess portions 15, 15' for forming a sidewall portion and a bead portion respectively.

A perfect cavity for molding a tire can be obtained by putting both half molds A and B together into a complete mold in which a container containing therein the above-mentioned fixed laminas type tread pattern is piled. The containers 7 containing fixed laminas 2 as a tread ring are fitted in the shells 14, 14' having recesses 15, 15' for forming a sidewall portion and a bead portion. The shell 14 has, as shown in FIG. 1, a circumferential vent groove 18 communicating with a positioning notch 4 and a plurality of vent holes 19 positioned circumferentially communicating with the vent groove 18 in order to vent gas out of the mold.

With respect to a method for manufacturing the lamina 2, a shape of a molding portion of the lamina 2 can be obtained by using, for example, a CAD (computer aided design) system. That is to say, after preparing a three-dimensional type model by using a computer, a laminar element is cut in accordance with a two-dimensional information derived from the section parallel to the equator plane of a tire. In that case, the following methods, for example, are preferably employed:

(1) A method wherein, for example, an information of a plan view and a profile view of a tire pattern, and an information of a section of a tread groove is input to a computer, then an image of a surface model having the tread pattern composed in accordance with a program input beforehand can be obtained.

(2) A method wherein, for example, an information of an outer diameter and a width of a tire, a width of a tread is input, then a desired image of a plane tire can be obtained in accordance with program for processing graphic input beforehand. The information concerning a tread groove such as a width or a depth of the groove is input to a computer in order to get a image having a desired sectional shape of a groove. By way of moving the image having a desired sectional shape along above-mentioned image of a plane tire, a image of a surface model or a solid model (shown in FIG. 4) having a tread pattern can be obtained in accordance with figure treatment program input beforehand.

As mentioned above, it is convenient to use a CAD system for manufacturing laminas 2, but the present invention is not limited to use a CAD system. It is also possible, for example, to determine the shape of laminas 2 by using numerial calculation.

Metalic material such as steel, stainless steel, aluminum alloy and brass, and engineering plastics, and the like are employable for laminas 2. In case of working a lamina made of a metalic material, an electrical discharge wire cutter can be preferably used. The use of a laser cutter increase the working speed. The laser cutter can be also used in cutting plastic.

The thickness of the lamina 2 is preferably 0.1 to 3.0 mm, more preferably 0.5 to 3.0 mm. In case that the thickness of the lamina 2 is larger than the above-mentioned range, the accuracy of working becomes worse. On the other hand, in case that the thickness of the lamina 2 is smaller than the above-mentioned range, the man-day increases as a result of the increase of the number of laminas.

As a method for fixing a plurality of piled up laminas 2, brazing can be used as well as bolting shown in FIG. 1. However, it is convenient to employ fixing method such as bolting which makes the disassembly easy in order to mend the lamina 2 or change the tread pattern thereof easily.

As a working method of a narrow groove 3 functioning as a vent hole, machine cutting, etching, grinding, and the like can be employable. In the embodiment shown in FIG. 1, only the tread molding portion are formed with a plurality of piled up laminas 2. But the whole metal mold can also be formed with a plurality of piled up laminas 2. In that case, it is preferable to set in piled up laminas forming an area SL (from the maximum sectional width portion of a sidewall to a bead portion) after integration by brazing. The above-mentioned container, then, naturally becomes unnecessary.

Figure 9A:
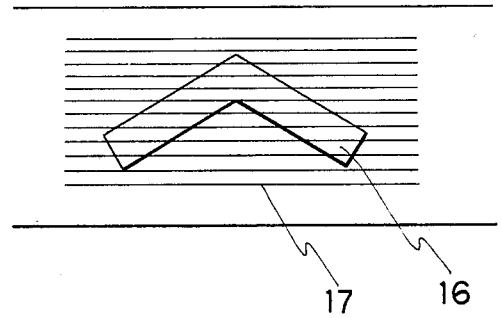
FIG. 9(a) is a plan view of a knife blade arranged in the circumferential direction of a tire mold of the present invention.
Figure 9B:
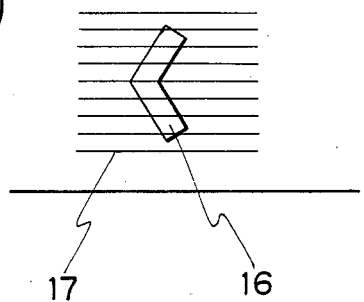
FIG. 9(b) is a plan view of a knife blade arranged in the radial direction of a tire mold of the present invention.

A projection 16 corresponding to a knife blade for forming the siping can also be formed in accordance with above-mentioned method. In that case, it is necessary to fasten the projections 16 of laminas together by brazing or glueing depending upon their shapes or arrangements since the projections 16 are thin in width. For example, a knife blade 16 of the circumferential direction shown in FIG. 9(a) does not require to be fastened one another. On the other hand, a knife blade 16 of the radial direction shown in FIG. 9(b) requires to be fastened one another. Numeral 17 is a laminating line.

EXAMPLE

Now referring to an example made on an experimental basis, the metal mold of the present invention is described.

Figure 4:
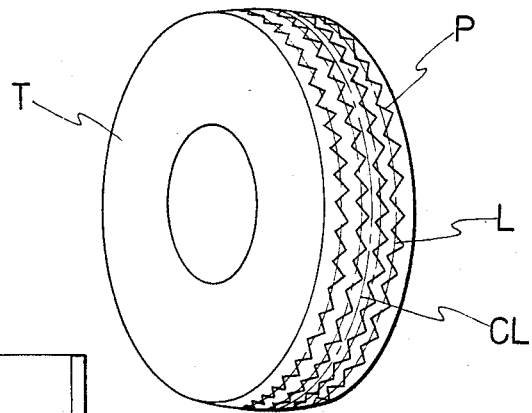
FIG. 4 is a view showing an example of an image-output of a surface model of a tire used in order to obtain the sectional shape of laminas in the present invention by using a CAD system.
Figure 5:
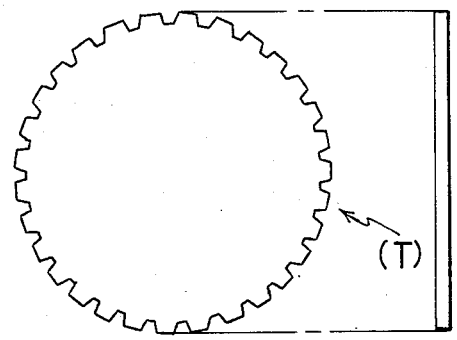
FIG. 5 is a view explaining a sectional shape of the surface model in FIG. 4 in a circumferential direction.
Figure 6:
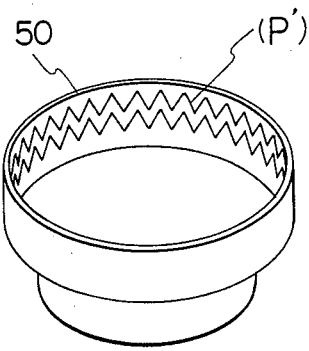
FIG. 6 is a view of external appearance of a half part of a tread ring for forming a tread pattern in a conventional metal mold.
Figure 7:
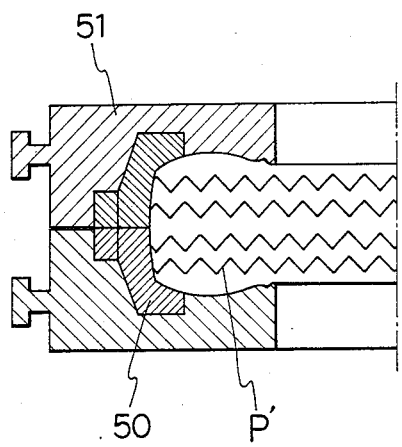
FIG. 7 is a partially sectional view of a shell in a conventional metal mold in which an upper and a lower halves of a tread ring are set.
Figure 8:
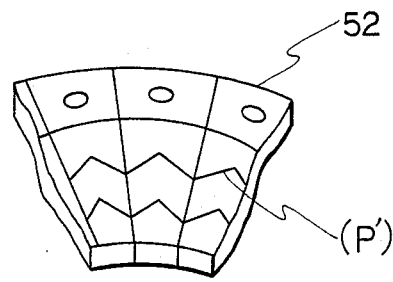
FIG. 8 is a view explaining tread segments for forming a tread pattern in a conventional metal mold.

First of all, by the use of CAD system a three-dimensional surface model (or solid model) of 7.00-15 RiB pattern type was prepared as shown in FIG. 4. Subsequently, planes parallel to the equator plane were defined at intervals of 1 mm from the center line of a tread by using a data processing program in order to obtain intersecting lines with above-mentioned model (pattern lines), i.e. to obtain a plurality of vertical sectional shapes of a tire (as shown in FIG. 5). NC data (numerical control data) for working laminas in accordance with a plurality of vertical sectional shapes was created by using NC data creating program. Laminas were worked with the electrical discharge wire cutter (the commercial name "JAPT-3F" manufactured by JAPAX INC). Cold-finished steel plate of SS 45 (structural steel 45 defined by Japanese Industrial Standard (JIS) of which minimum tensile strength is 45 kgf/mm$^2$) of 1.0 mm in thickness was used for the material of laminas. Working conditions were such that the diameter of a wire was 0.2 mm, the feed speed was 12 mm/minute, the working voltage was about 50 V and the working electric current was about 3 A. The use of the laser cutter instead of the electical discharge wire cutter enabled to get about forty times working speed without causing the worse accuracy.

By way of applying above-mentioned method, 148 sheets of laminas, i.e. 74 for the upper half mold and 74 for the lower half mold, were worked to form tire pattern portion. On each laminas, narrow grooves (vent lines) of 0.1 mm in depth for venting air were made by cutting work. It is not always necessary to provide all the laminas with the narrow grooves.

Figure 2:
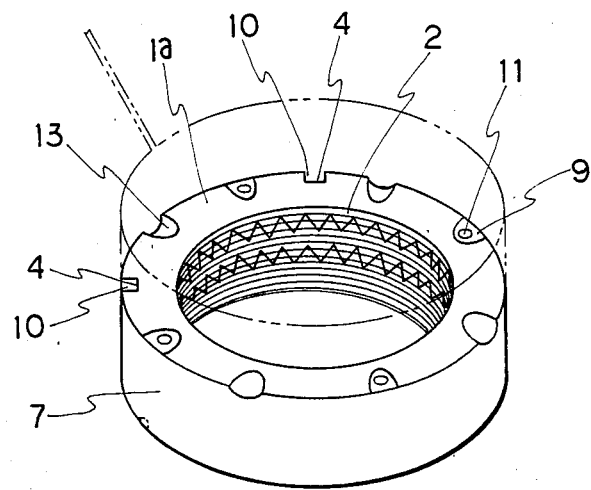
FIG. 2 is a perspective view of a container in which a half part of a metal mold of a tread pattern portion in the present invention is contained.

Lastly, the outer shape of laminas were cut corresponding to the fitting shape with shells, then laminas were set in the container 7 as shown in FIG. 2, clamped with the fixing piece 9, the bolt passing through the laminas up and down and nut 11a in order to form a tread ring 1a. After forming the tread ring 1a in this manner, the tread ring 1a was set in a shell to complete a metal mold for tire vulcanization 1. The metal mold 1 was satisfactorily used for vulcanization of a tire. The spew-less tire can be obtained by using the metal mold of the present invention since the narrow groove acting as vent holes are very narrow.

It is further understood by those skilled in the art that the foregoing description is a preferred embodiment of the disclosed device and that various changes and modifications may be made in the invention without departing from the spirit and scope thereof.

What is claimed is:

1. A method for making a metal mold for tire vulcanization comprising slicing a tire into a plurality of laminas parallel to an equator plane of the tire, preparing a plurality of metal or the like laminas each of which has an internal molding portion corresponding to sectional shape of a tread portion from the external configuration of said laminas of the tire stacking up and fixing the obtained laminas in order to define an internal shape on said mold corresponding to the external tread of a tire to be vulcanized therein.

2. A method according to claim 1, wherein the laminas are 0.1 to 3.0 mm in thickness.

3. A method according to claim 1 wherein the laminas are made of a material selected from the group consisting of steel, stainless steel, aluminum alloy, brass, and engineering plastics.

4. A method for making a metal mold for tire vulcanization comprising slicing a tire into a plurality of laminas parallel to an equator plane of the tire, preparing a plurality of metal or the like laminas each of which has an internal molding portion corresponding to sectional shape of a tire from the external configuration of said laminas of the tire stacking up and fixing the obtained laminas in order to define an internal shape on said mold corresponding to the external tread of a tire to be vulcanized therein.

5. A method according to claim 4, wherein the laminas are 0.1 to 3.0 mm in thickness.

6. A method according to claim 4 wherein the laminas are made of a material selected from the group consisting of steel, stainless steel, aluminum alloy, brass and engineering plastics.

* * * * *